United States Patent [19]

Hapka

[11] Patent Number: 5,619,412
[45] Date of Patent: Apr. 8, 1997

[54] REMOTE CONTROL OF ENGINE IDLING TIME

[75] Inventor: Roger J. Hapka, Columbus, Ind.

[73] Assignee: Cummins Engine Company, Inc., Columbus, Ind.

[21] Appl. No.: 325,908

[22] Filed: Oct. 19, 1994

[51] Int. Cl.$^6$ .................................................. G06F 11/30
[52] U.S. Cl. ............................. 364/424.045; 364/424.03; 364/431.09; 123/179.2; 123/179.4; 340/825.29
[58] Field of Search ........................ 364/424.03, 424.04, 364/424.07, 424.05, 550, 431.09; 123/198 D, 198 DC, 179.2, 179.3, 179.4; 340/439, 441, 825.06, 825.29

[56] References Cited

U.S. PATENT DOCUMENTS

| | | | |
|---|---|---|---|
| Re. 30,686 | 7/1981 | Bucher | 290/38 R |
| 4,102,316 | 7/1978 | Valbert | 123/198 DB |
| 4,258,421 | 3/1981 | Juhasz et al. | 364/424.03 |
| 4,307,455 | 12/1981 | Juhasz et al. | 364/900 |
| 4,804,937 | 2/1989 | Barbiaux et al. | 364/424.01 |
| 4,926,331 | 5/1990 | Windle et al. | 364/424.04 |
| 5,025,253 | 6/1991 | DiLullo et al. | 340/825.06 |
| 5,072,703 | 12/1991 | Sutton | 123/179.4 |
| 5,303,163 | 4/1994 | Ebaugh et al. | 364/550 |
| 5,426,585 | 6/1995 | Stepper et al. | 364/424.03 |
| 5,448,479 | 9/1995 | Kemner et al. | 364/424.02 |

OTHER PUBLICATIONS

SAE Technical Paper Series 902215, "Data Link Overview for Heavy Duty Vehicle Applications" by Mark R. Stepper, Cummins Electronics Co., Inc. Oct. 29 –Nov. 1, 1990, pp. 81–94.
Cummins CELECT™, "Programmable Engine Parameters; CELECT", Feb. 1993, Cummins Engine Company, Inc.

Primary Examiner—Kevin J. Teska
Assistant Examiner—Tan Nguyen
Attorney, Agent, or Firm—Sixbey, Friedman, Leedom & Ferguson; Charles M. Leedom, Jr.; Karlton C. Butts

[57] ABSTRACT

A system for remotely accessing an engine control system and selectively controlling and changing an existing engine algorithm. In a preferred embodiment, the system comprises an on-board vehicle communications system which receives and sends data to a remote central fixed base site. A truck operator contacts the fleet base manager via the on-board communications system and requests, for example, that the engine idle for a specified period of time. The fleet base manager at the remote central fixed based site then transmits data from a computer over a communications channel to the vehicle's on-board communications system. The data is sent through a remote command interface device which translates the data in language recognizable by an engine control device. Based on the data transmitted, the engine control device disables an existing idle shutdown system and permits the engine to remain idle for an amount of time specified by the truck fleet manager.

25 Claims, 7 Drawing Sheets

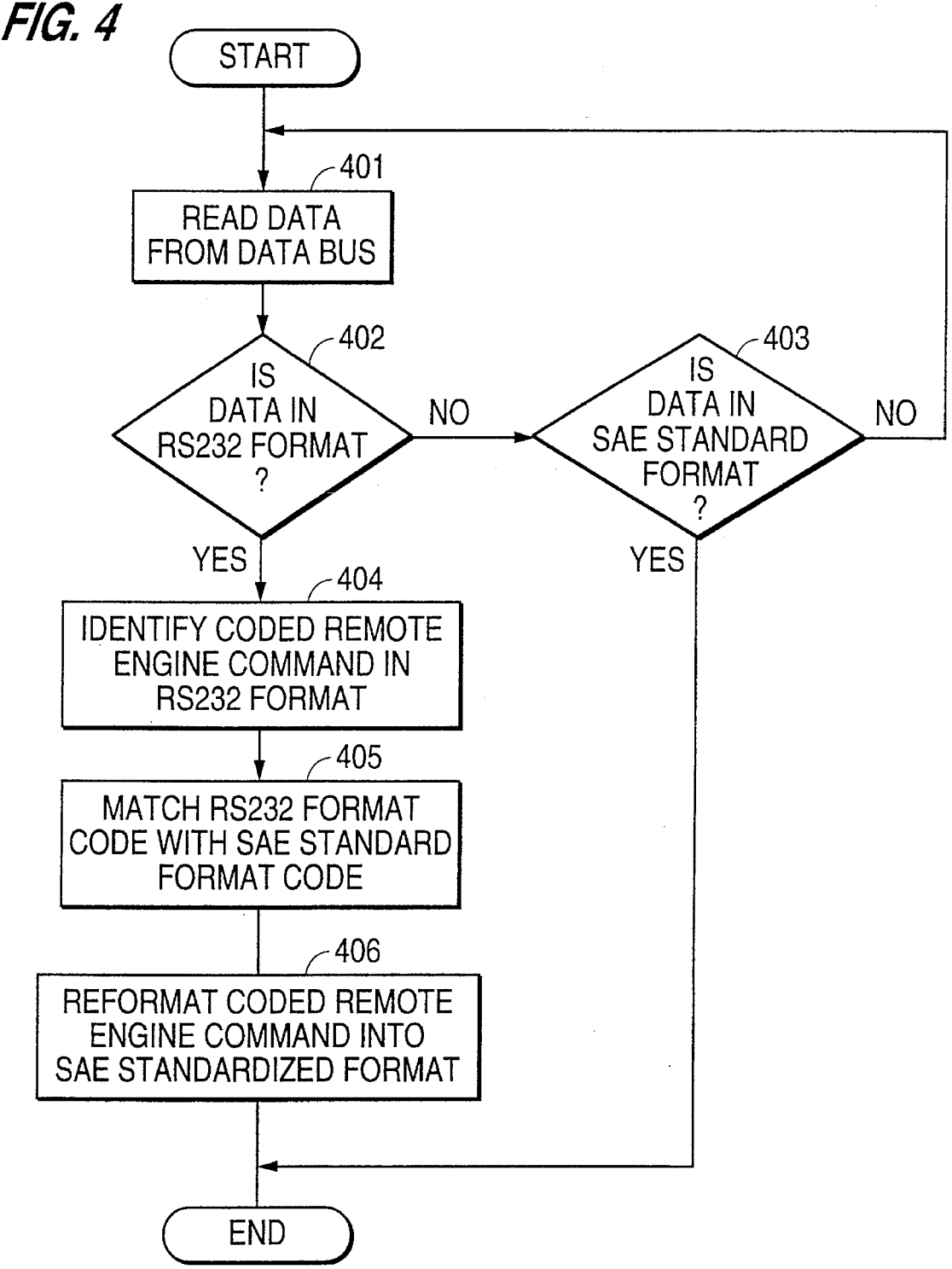

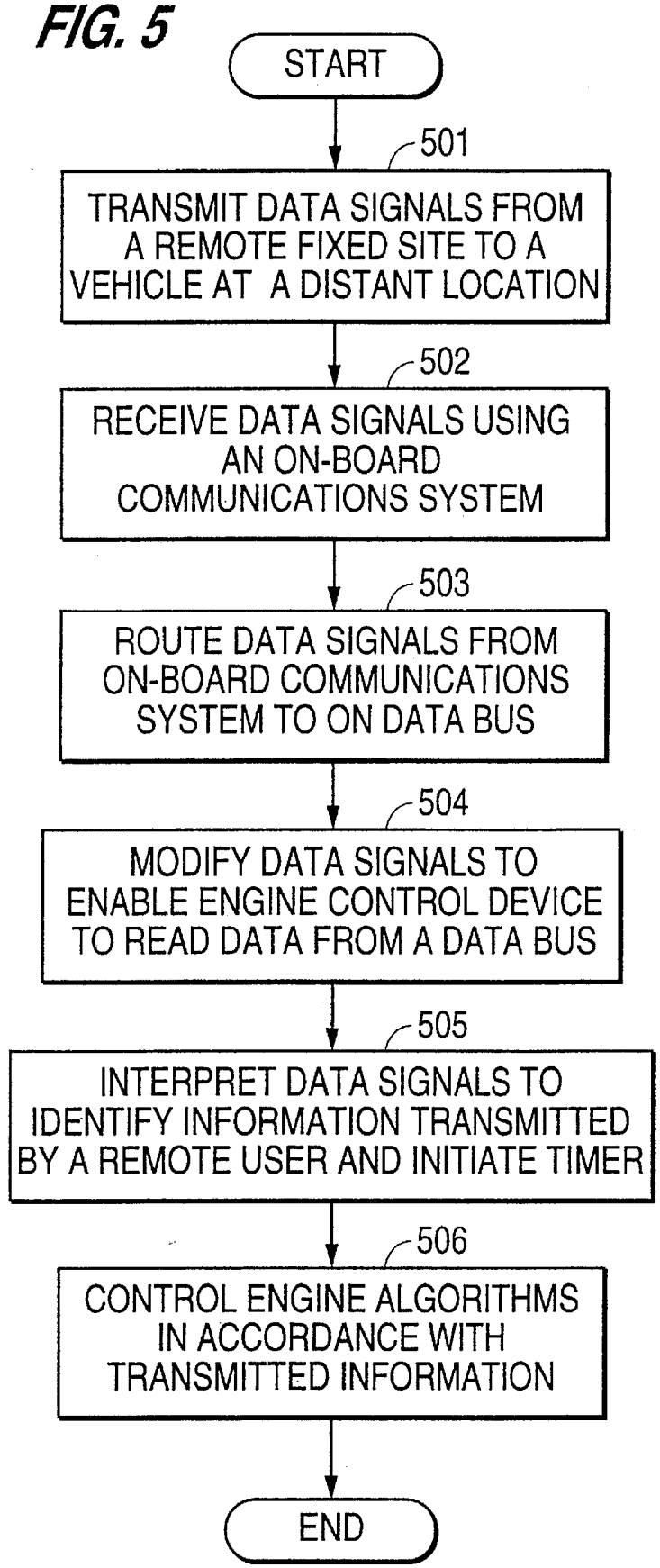

REMOTE CONTROL OF ENGINE IDLING TIME

TECHNICAL FIELD OF THE INVENTION

The present invention relates generally to vehicle control systems, and more particularly, to control systems which can remotely modify operating functions of a vehicle's engine via an on-board vehicle communications system.

BACKGROUND OF THE INVENTION

Remote monitoring of the operation and location of vehicles has long been considered desirable by those charged with managing vehicle fleets. For example, remote monitoring systems have been used in trucks engaged in interstate travel to monitor engine functions by remotely accessing data recorded from sensors placed within the engine. Truck fleet managers can use this data to evaluate engine performance and necessary maintenance schedules. One concern of truck fleet managers is excessive idling of heavy duty truck engines which results in increased fuel usage and maintenance costs. A way to control these costs is to automatically turn the engine off after a predetermined amount of idle time. For example, existing engine control systems such as those developed by the assignee, Cummins Engine Company, detect unattended idling and stop the engine after a predetermined time. Such systems make use of an electronic data link and control system such as that disclosed in SAE Technical Paper Series 902215, "Data Link Overview for Heavy Duty Vehicle Applications," by Mark R. Stepper, Cummins Electronics Co., Inc.

Many truck operators, however, need to idle the engine for long periods of time to heat or cool the truck cabin. To facilitate idling for this purpose, some idle shutoff systems are provided with an override feature. As an example, a warning light may be illuminated thirty seconds before the engine is to be shut down after a long period of idling. Then, if the driver presses the accelerator or brake pedal while the warning light is on, the idle shutdown is bypassed. None of these alternatives are entirely satisfactory. If the control system is not provided with an override feature to prevent automatic shutdown, it may be impossible to maintain a desired temperature in a sleeper cab, making it necessary for the driver to rent a motel room at considerable cost. However, if the driver is able to override an automatic shutdown, the system will not be highly effective for reducing operating costs since the driver can override the automatic shutdown at will, even in situations where an override is not appropriate.

U.S. Pat. No. 4,258,421 discloses an on-board system comprising a plurality of sensors, a data processing and recording device, a portable data link and a central computing apparatus, which analyzes the data and provides summary reports. The sensors detect the vehicle's operating parameters and generate data signals. The data processing and recording device processes the data signals. The portable data link reads stored data signals into a non-volatile memory from which they can be downloaded to the central computing apparatus, which analyzes the data and provides summary reports. The system disclosed in U.S. Patent No. 4,258,421 does not provide real-time monitoring, nor does it transmit data to a vehicle for modifying existing engine control parameters.

Systems of the type shown in U.S. Pat. No. 4,804,937 improve upon the aforementioned design by allowing a base station to transmit driver instructions and control sensor calibration in a plurality of vehicles from a central location. A plurality of communication modules attached to a standardized data bus in the vehicle transmit operating status information to a control module. The communications control module records the transmitted information and subsequently transmits the information to a base station via a radio frequency (RF) transmitter. The system also includes a driver interface module for transmitting information to and from a vehicle operator and a recorder for receiving and recording information supplied by the communications modules. However, like the system in U.S. Pat. No. 4,258,421, this system fails to provide a system for remotely varying vehicle engine operating algorithms, that is, the system is not able to modify the sequence of operating commands implemented by a computer operated engine controller.

Systems have also been developed for starting engines by remote control. U.S. Pat. No. Re. 30,686 discloses a remote control starting system for a vehicle engine which can also stop the engine under specified circumstances. Specifically, the starting system is activated by a coded control signal from a transmitter carried by the user. Once activated, the starter system stops the engine after a predetermined time period has lapsed. Nevertheless, systems of the type disclosed in U.S. Pat. No. Re. 30,686 do not provide the capability to remotely override and/or modify an existing engine control algorithm and do not control multiple vehicles from a central dispatch station.

Accordingly, there is a need for an improved system that overcomes these problems and deficiencies in present systems.

SUMMARY OF THE INVENTION

Therefore, it is a general object of the present invention to provide a system for remotely modifying engine control system parameters.

It is further an object of the present invention to provide a system that can change an existing engine algorithm from a remote location.

It is an object of the present invention to provide a system that stores transmitted data in the memory of an engine control system to subsequently change an existing engine algorithm.

It is another object of the present invention to provide a system that bypasses an existing engine algorithm and controls engine operation for a finite time period.

It is yet another object of the invention to provide a system that can translate the format of a data signal transmitted to a vehicle from a remote location.

It is an object of the present invention to provide a system for controlling and modifying the idle time of an engine from a remote location.

It is yet another object of the invention to provide a system for controlling and modifying idle times of a plurality of vehicle engines from a central dispatch location.

It is yet a further object of the present invention to provide the capability to override an existing idle shutdown feature through the use of an on-board communications system.

It is another object of the present invention to remotely enable or disable an idle shutdown feature for an agreed period of time.

It is an object of the present invention to provide a system that stores transmitted data in the memory of an engine control system to subsequently enable or disable an engine idle shutdown feature for an agreed period of time.

It is further another object of the present invention to provide a system that bypasses an existing engine idle shutdown system and controls engine operation for a finite time period.

These, as well as other objects of the present invention, are achieved by providing a system for remotely accessing and modifying the engine control system and selectively modifying vehicle operating parameters. In a preferred embodiment, the system enables or disables an existing idle shutdown feature in response to commands from a central dispatch station or fixed base site. The system may include an on-board vehicle communication system which receives and sends data to a remote fixed site. The truck operator can contact a fleet base manager via the on-board communications system and request that the engine be allowed to idle for a specified period of time. The fleet base manager at the remote fixed site then transmits data from a computer terminal over satellite, RF link or other communicative means to the on-board vehicle communications system. The data is sent through a remote command interface device via a data link or serial communications data bus. The remote command interface device modifies the data using translating software so it is readable by the engine control system. Based on the data transmitted, the engine control system disables the idle shutdown device and permits the engine to remain idle for an amount of time specified by the truck fleet manager. The translating software may be housed in a separate remote command interface device or it may be incorporated into other system components. For example, the translating software may be incorporated into the computer terminal at the fixed base site, the on-board vehicle communications system or the engine control system. This system solves the problem of excessive idling by allowing a fleet manager to remotely control the idle time of a vehicle engine to reduce fuel usage and maintenance costs.

BRIEF DESCRIPTION OF THE DRAWINGS

FIG. 4 is a flowchart of the translating software algorithm of the remote command interface in the preferred embodiment.

FIG. 5 is a block diagram of a preferred method of implementing the present invention.

FIG. 6a is a block diagram of a third embodiment of the present invention.

DETAILED DESCRIPTION OF PREFERRED EMBODIMENTS

The present invention relates generally to remote control of engine operation algorithms. The invention will be explained using remote control of an idle shutdown device as an example, but those skilled in the art will appreciate that the same principles can be used to modify any engine operating algorithm from a remote station as desired.

Figure 1A:
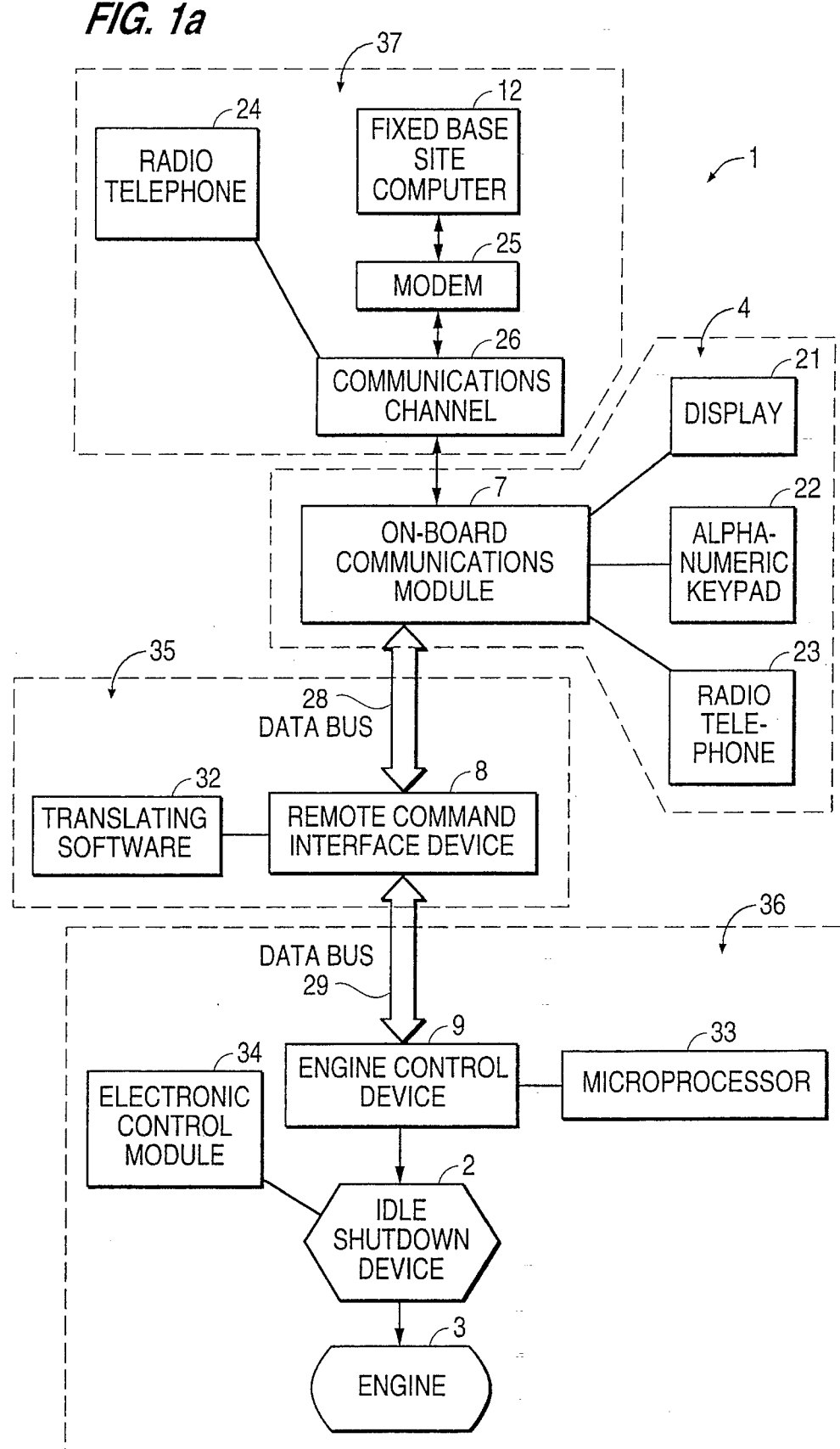
FIG. 1a is a block diagram of the preferred embodiment of the vehicle control system.

FIG. 1a of the drawings illustrates a preferred embodiment of the present invention. Vehicle control system 1 comprises fixed base site equipment 37, an on-board communications system 4 located on a vehicle remote from the fixed base site, a remote command interface section 35 and an engine control system 36. The fixed base site equipment includes a computer 12 with a radio telephone 24, a modem 25, and a communications channel 26. The on-board communications system 4 includes an on-board communications module 7 with a display 21, alphanumeric keypad 22, and a radio telephone 23. The remote command interface section 35 comprises a data bus 28 and a remote command interface device 8. Data bus 28 connects the on-board communications module 7 with remote command interface device 8. The remote command interface device 8 is a digital information processing circuit constructed using an integrated circuit or a circuit made up of integrated circuit devices. Furthermore, remote command interface device 8 is provided with software or firmware that implements the functions described herein with reference to the flowchart of FIG. 3. The software provided with the remote command interface device 8 translates the data on data bus 28. Engine control system 36 comprises an engine control device 9 which includes a microprocessor 33 for storing, processing, and implementing a sequence of data commands received from data bus 29. The engine control device 9 is directly connected to an idle shutdown device 2 which houses an electronic control module 34 for monitoring the throttle, clutch, and service brake for activity before the engine 3 is shut down.

In the preferred embodiment, vehicle control system 1 allows a remote user, typically a fleet manager, to enable or disable an engine idle shutdown device 2 attached to a vehicle's engine 3. Operation of this system allows the engine 3 to idle for a period of time entered by the remote user. Specifically, the vehicle control system 1 includes an on-board communications system 4 which comprises transceiver circuitry for sending and receiving messages from a remote user located at a fixed base site 10, shown in FIG. 1b, via a communications channel 26. The communications channel 26 may be a satellite uplink, radio frequency (RF) transmission, or any other communication means for transmitting data from a mobile location to a fixed base site. Communications channel 26 may comprise a combination of several communications channels, such as a cellular radio telephone link in conjunction with a satellite packet data link. The radio telephone 23 of the present invention comprises standard circuitry used in current cellular radiotelephone systems for transmitting and receiving wireless information from a remote location.

The remote user of the vehicle control system 1 is located at a fixed base site, from which she can send and receive voice and data messages from one or more vehicle operators. The fixed base site equipment 37 includes a communications channel 26, such as a satellite or RF link, modem 25 and computer 12, on which data messages are received and transmitted. Modem 25 can operate at any speed, however, a high speed modem such as one operating at 14,400 baud is preferred. These modems may be purchased from any major modem manufacturer such as Hayes or Intel. Computer 12 is a standard desktop computer system such as those manufactured by IBM or Apple. Preferably, computer 12 has at least an Intel 486DX processor or equivalent, to efficiently process the data received from the remote vehicle operators.

In operation, the end user or fleet manager dispatches a vehicle equipped with the vehicle control system 1 for a distant destination. The engine idle shutdown device 2 is programmed to stop engine 3 after an idle time of a specified duration is detected, for example, an idle condition persisting for five minutes would cause automatic stoppage of the engine. An electronic control module (ECM) 34 monitors the throttle, clutch and service brake for activity and also monitors the vehicle and engine speed for any change in engine idling activity. If the vehicle operator does not use the throttle, clutch, or service brake within the programmed time and no changed engine idle activity is detected, the idle shutdown device 2 will proceed to shut down engine 3. In the preferred embodiment, a yellow warning lamp in the cab of the vehicle will flash for 30 seconds prior to engine shutdown to alert the vehicle operator that the idle shutdown system is activated and will stop the engine after 30 seconds have expired. The vehicle operator can prevent engine shutdown by pressing the brake, clutch or accelerator pedals during the warning period. Once the vehicle operator takes appropriate measures to prevent engine shutdown, the idle shutdown detection timer is restarted for the programmed period. The timer in the idle shutdown device 2 can be programmed for any predetermined period of time, such as sixty minutes. The idle shutdown device may be constructed by appropriately modifying a conventional idle shutdown device as found in the CELECT Engine Control System currently manufactured by the assignee, Cummins Engine Company. Specifically, according to the present invention, the conventional idle shutdown device 2 is provided with a novel override feature which will be described in detail later with reference to FIG. 2.

When the vehicle operator determines that the vehicle's engine 3 needs to remain idle for a period of time longer than allowed by the engine idle shutdown device 2, the operator contacts the remote user or fleet manager via the on-board communications system 4. A vehicle operator may choose to request that the engine 3 remain idle for an extended period, for example, in order to heat or cool the cabin of the vehicle overnight.

In a less preferred embodiment, the fleet manager may allow the vehicle operator the option of overriding the idle shutdown device 2 from the cabin of the vehicle. In this embodiment, no contact with the remote user or fleet manager is needed in order for the vehicle operator to modify the engine control device 9 and control existing engine functions. This embodiment provides the advantage of reducing communications costs and allowing the operator to have more control over the vehicle operation. Nevertheless, this embodiment is less preferred because the vehicle operator is able to override the idle shutdown device in situations where an override is not appropriate, thus increasing operating costs unnecessarily.

In the preferred embodiment, however, the vehicle operator has the option of sending a voice or data message to the fleet manager via on-board communications system 4. The on-board communications module 7 may comprise a radio telephone 23, as illustrated in FIG. 1a, for communicating with the fleet manager in a voice mode. In this mode of operation, the vehicle operator dials the telephone number of the fixed base site 10 on an alphanumeric keypad 22 and verbally requests that the engine 3 remain idle for agreed period of time (e.g. up to 10 hours). The vehicle operator may also use the alphanumeric keypad 22 for entering data messages to transmit to the fixed base site 10. The alphanumeric keypad 22 allows the vehicle operator to type in both letters and numbers to identify the vehicle, the operator, location of the vehicle, and the amount of idle time needed by the vehicle operator. The onboard communications module also includes a display 21 which shows the characters entered by the vehicle operator and allows the entered message to be edited before transmission to the fixed base site 10. The display 21 can be either a light emitting diode (LED), liquid crystal display (LCD), or other similar type of display.

Figure 1B:
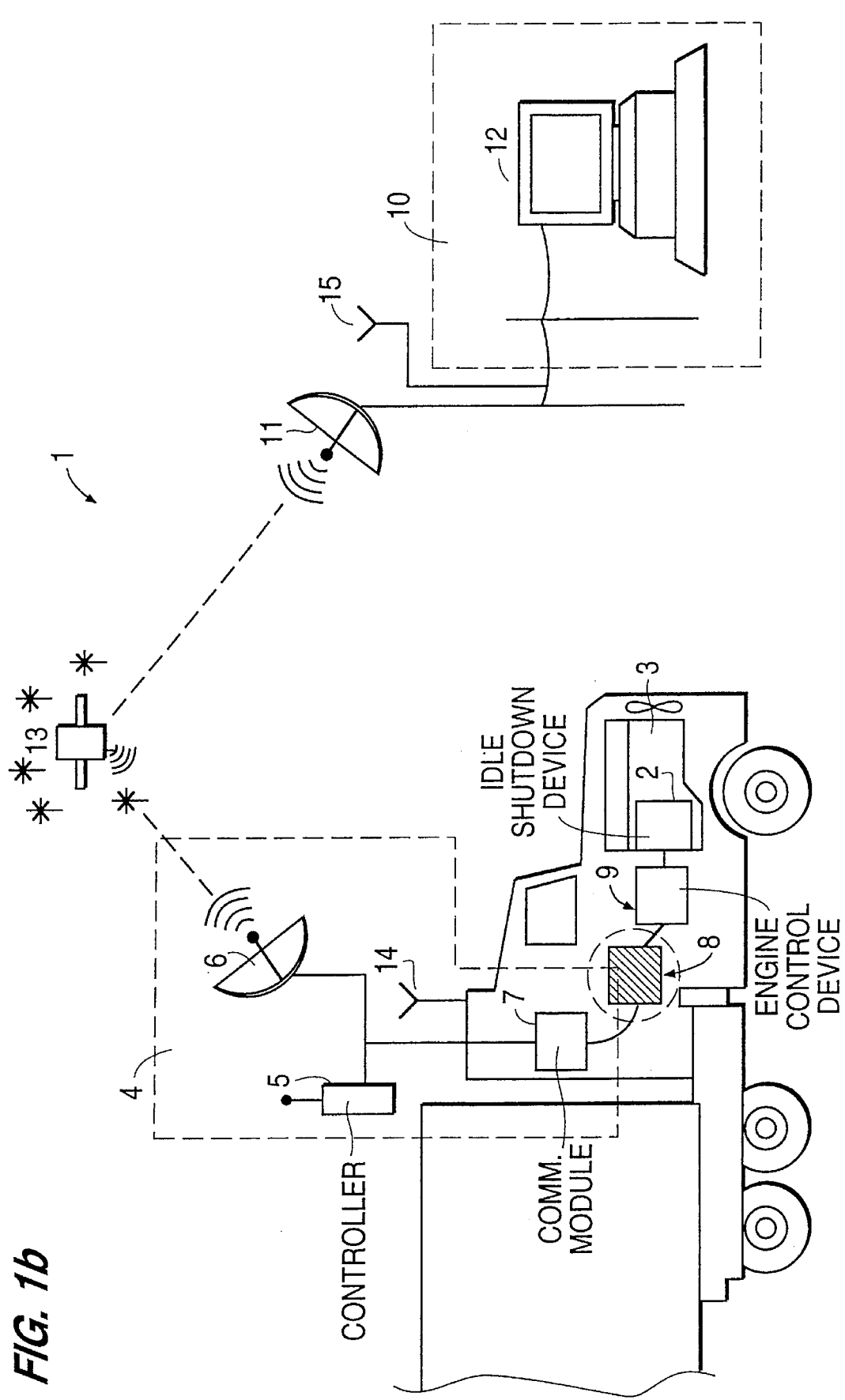
FIG. 1b is an illustration of the preferred embodiment of the vehicle idle control system.

FIG. 1b illustrates a remote vehicle control system 1 comprising a computer 12 located at a fixed site 10, a satellite dish 11 for transmitting data via satellite 13 to satellite dish 6 located on the vehicle and controlled by controller 5. The remote vehicle system 1 further comprises an on-board communications module 7, remote command interface device 8, engine control device 9, idle shutdown device 2 and an engine 3. When the vehicle operator uses the radio telephone 23 to make a voice call or the alphanumeric keypad 22 to enter a data message, as shown in FIG. 1a, the information is transmitted by RF link, satellite 13, or other similar communicative means using communications channel 26. If transmitted by satellite, the data or voice message is transmitted from the satellite dish 6 located on the top of the vehicle. The satellite dish controller 5 positions the satellite dish 6 to transmit the message in the direction of a predetermined satellite 13. If the vehicle operator is in radio range of the fixed base site 10 and chooses to transmit the voice or data message over an RF link, the signal is sent at a predetermined frequency to the fixed base site 10 or on an RF communications network linking the vehicle to the fixed base site 10, such as a cellular telephone network.

The remote user or fleet manager receives the vehicle operator's voice or data message via satellite 13 or RF link. If a data signal is transmitted via satellite 13 or RF link, the signal is received by the satellite dish 11 or antenna 15, respectively, and sent via modem 25 to the fixed base computer 12 for processing. The fleet manager is able to view the transmitted message on the computer 12 screen and determine from which vehicle the message was sent. Using the computer 12 keyboard, the fleet manager then activates transmission of a control message to the vehicle control system to disable the idle shutdown device 2 of the identified vehicle and allow the vehicle to idle for the period of time requested by the vehicle operator.

Figure 2:
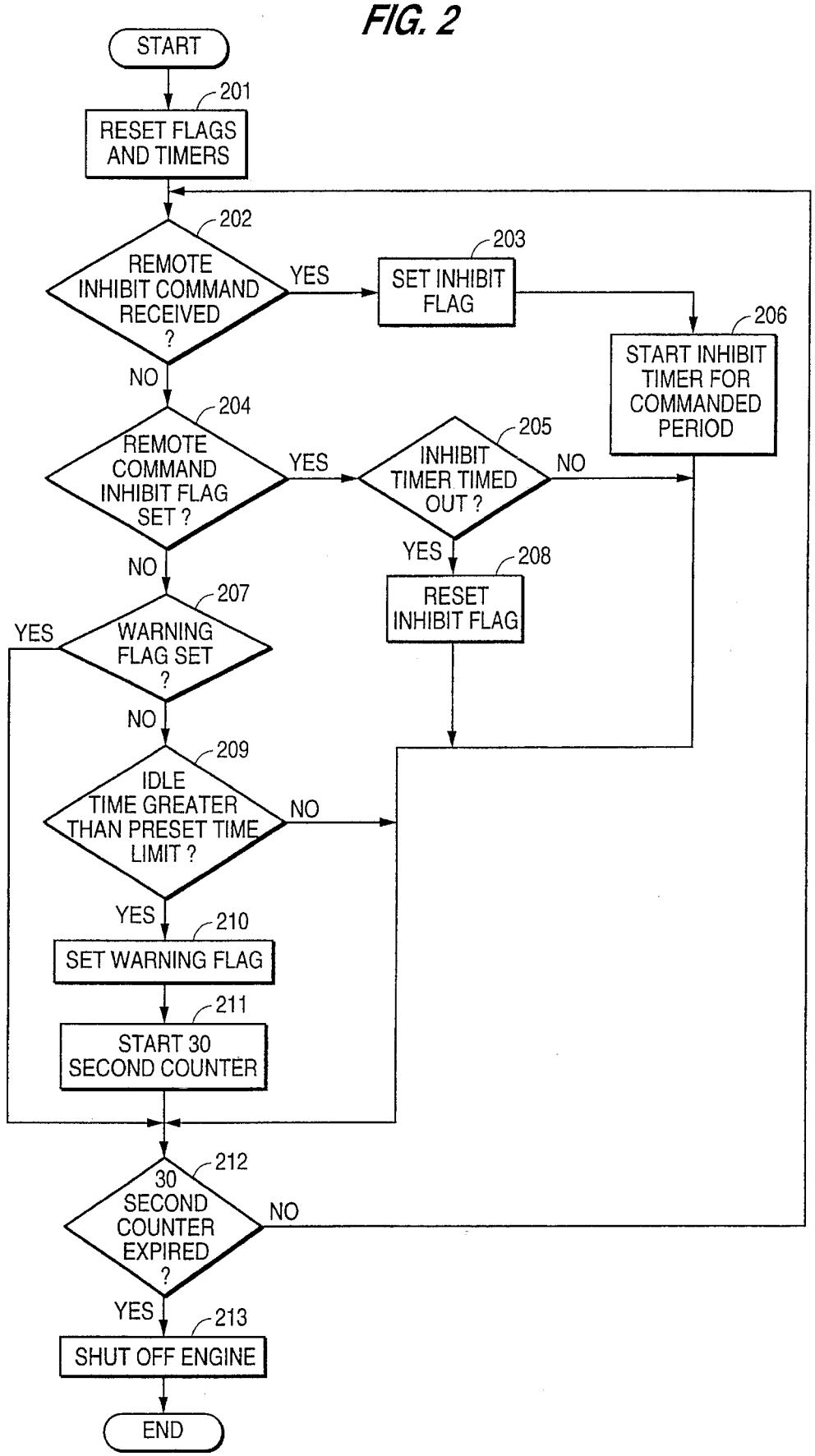
FIG. 2 is a flowchart of idle shutdown operation in the preferred embodiment.

FIG. 2 is a flowchart showing the idle shutdown algorithm of the present invention. In operation, the remote control message is detected by the engine control device 9, shown in FIG. 1a, and a timer is activated for the period of time programmed by the fleet manager. After the idle shutdown device 2 is disabled by the control message sent by the fleet manager, the timer runs for the programmed time allowing the engine to idle for that agreed period. When the timer has expired, the engine control system 36 enables the idle shutdown device 2, as illustrated in FIG. 1a. Idle shutdown algorithm begins with resetting the flags and timer, as shown in block 201, in the idle shutdown device 2 of FIG. 1a.

As shown in block 202, a command is received in idle shutdown device 2. If the command is received, an inhibit flag is set in block 203, and a timer located in the idle shutdown device 2 begins. If an inhibit command is not received, the idle shutdown device 2 determines whether a remote command inhibit flag has been set, as shown in block 204. If the inhibit flag is set, the idle shutdown device 2 then determines in block 205, whether the inhibit timer has timed out. If so, the inhibit flag is reset in block 208. If the remote command inhibit flag is not set, the idle shutdown device 2 attempts to identify a warning flag in block 207. If the warning flag is set, device 2 determines whether the 30 second counter has expired in block 212. If a warning flag is not set, the idle shutdown device 2 then compares the idle time to the preset time limit in block 209. If the idle time exceeds the preset time limit, a warning flag is set in block 210, and a 30 second counter begins, as indicated in block 211. If the idle time is less than the preset time limit, idle shutdown device 2 determines whether the 30 second clock has expired in block 212. If so, the engine is shut off in block 213. If not, device keeps checking to determine when the 30 second clock times out. Once the engine is shut off, the vehicle operator must turn the key to the "OFF" position, prior to restarting the engine.

In another less preferred embodiment of the invention, vehicle control system 1 can function for remote manual activation and deactivation of the idle shutdown device 2. The fleet manager can transmit a control message to the vehicle to disable the idle shutdown device 2. Instead of using a timer housed in the engine control device 9, the fleet manager would keep track of the time at the fixed base site 10 and transmit a second control message to enable the idle shutdown device 2 at the agreed time. This alternative mode of operation could be used when the fleet manager cannot predict the idling time necessary for the vehicle operator to heat or cool her cabin.

If the vehicle operator sends a voice transmission to the fleet manager, the vehicle operator can verbally request that the idle shutdown device 2 be disabled and the fleet manager can then transmit a data message to the vehicle to temporarily disable the idle shutdown device 2 for extended engine idling time. Based on the origin of the voice call, the fleet manager can identify the vehicle and the operator who is requesting more engine idling time.

The fleet manager may transmit data to the vehicle requesting extended engine idling time via the same communicative means used by the vehicle operator (i.e., satellite, RF link, or by another communications link). The data is received by the satellite dish 6 or antenna 14, and is sent directly to the on-board communications module 7. The vehicle operator is prompted when the data reaches the on-board communications module 7. A message is shown on the display 21 informing the vehicle operator that data has been sent and successfully received by the on-board communications module 7. The data is then routed from the on-board communications molecule 7 via a data port, such as an RS 232 port, which is connected to a high speed data communications bus 31, which may be, for example, an SAE J1708/J1587 data bus. The high speed data communications bus 28 connects the on-board communications module 7 with the remote command interface device 8.

Figure 3:
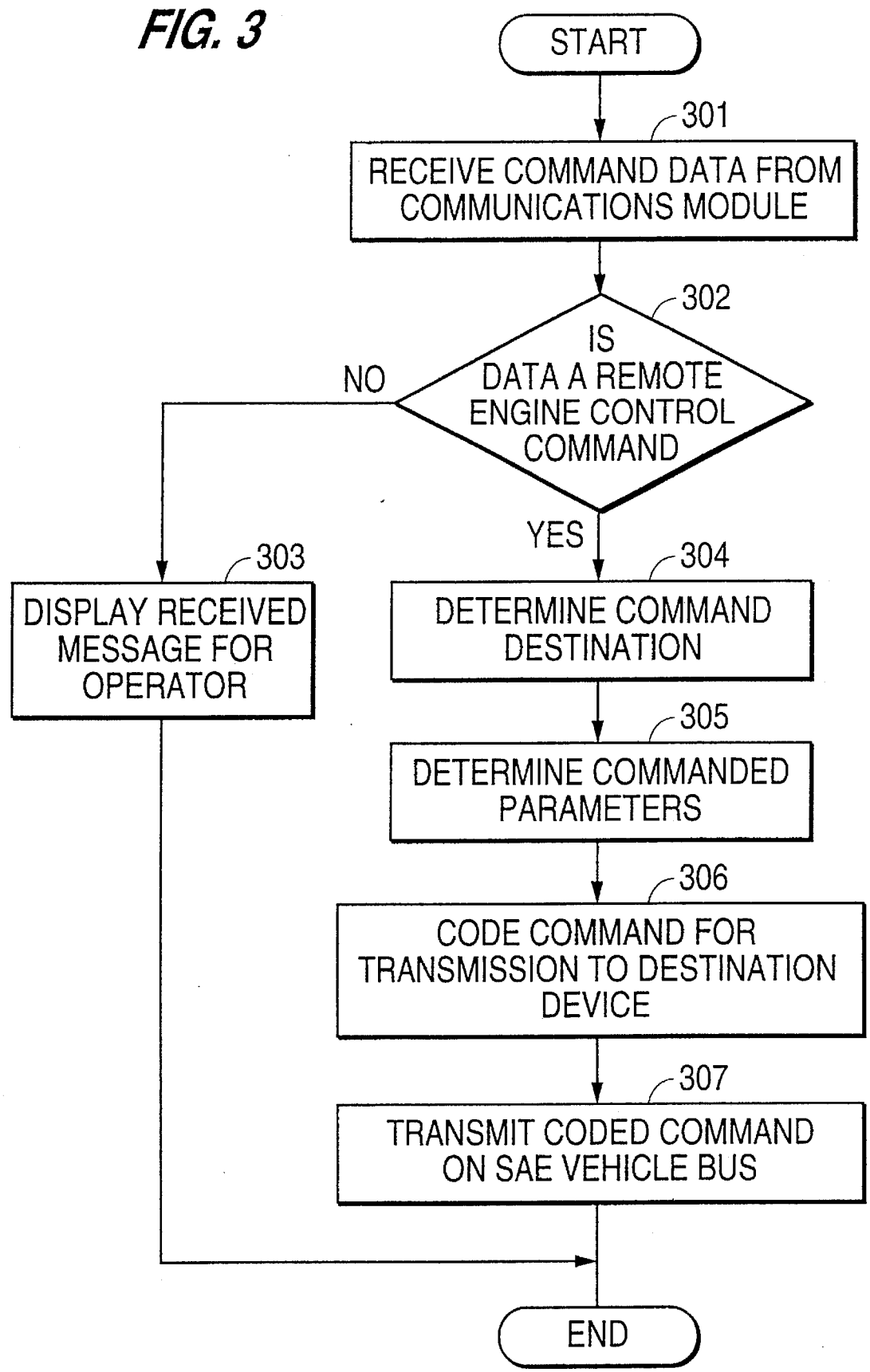
FIG. 3 is a flowchart of the remote command interface operation of the vehicle control system in the preferred embodiment.

FIG. 3 is a flowchart showing the operation of the remote command interface section 35, as shown in FIG. 1a. The operation begins with block 301, in which command data is received from the on-board communications module 7 via data bus 28. In block 302, the remote command interface device 8 then analyzes the data on data bus 28 to determine if the data is a remote engine control command sent from a remote user to modify existing engine parameters to control engine idle time or a similar engine function. If the data is not a remote engine control command, it is displayed on the on-board communications module 7 as a message for the vehicle operator, as shown in block 303. If the data is a remote control engine command, the remote command interface device 8 determines the engine function to which the remote command relates and calculates the destination of the command to carry out the determined function, as noted in block 304. The remote command interface device 8 then determines the parameters of the command sent by the remote user, as indicated in block 305. The command is then coded in block 306 by the translating software 32 and transmitted in block 307 onto a vehicle data bus 29.

FIG. 4 illustrates the operation of the translating software 32 in accordance with a preferred embodiment of the invention. When data is routed from the on-board communications module 7, it is converted from parallel form to serial form for transport on the data bus 28 to the remote command interface device 8 (all shown in FIG. 1a). In step 401, the translating software 32 reads the serial data from the data bus 28 and analyzes it in step 402 to determine whether it is in an RS 232 format. Data that is in an RS 232 format can be identified by an RS 232 port. If the data is not in RS 232 format, translating software 32 in step 403 determines whether the data is in an SAE standard format. The SAE format allows an engine control system using an SAE vehicle bus to identify the data on the data bus. If the data is not in a RS 232 format or a SAE standard format, then the translating software 32 attempts to read more data from data bus 28. If the data is in an SAE standard format, no translation of the data is necessary and the data can be directly routed to the engine control device 9 on the data bus 29, shown in FIG. 1. If the data is in RS 232 format, the translating software identifies the coded remote engine command in RS 232 format which is shown in step 404. At this stage, the remote engine command is analyzed to determine which engine control function the command is directed. In step 405, the RS 232 format is then cross referenced with the SAE standard format to translate the RS 232 command into SAE standard form. The coded remote command is then re-coded into an SAE standard format in step 406 for transmission to the engine control device on the data bus 29.

FIG. 5 illustrates a preferred operating method used in the present invention. When a remote user or the fleet manager chooses to modify and control an engine algorithm, such as engine idling, of one or more vehicles in her fleet, she receives voice or data messages from the vehicle operator for a desired engine idling time. The fleet manager analyzes the messages and transmits data signals from her fixed base computer 12 to a vehicle at a distant location, as shown in block 501. The on-board communications system 4 located on the vehicle receives the data signals transmitted by the fleet manager, as noted in block 502, via the on-board communications system 4 and displays any transmitted messages for viewing by vehicle operator. The data signals are then routed in block 503 from the on-board communications module 7 onto a data bus 28. The data signals are then modified in block 504 by translating the signals from an RS 232 format to an SAE Standard format to be read by the engine control device. When received by the engine control device, the data signals are interpreted in block 505 to identify the information transmitted by the remote user or the fleet manager. The identified information may then be stored for future use. For example, the transmitted information may activate a timer which may be programmed remotely for a specified period of time (e.g. 10 hours). After the programmed time period has expired, the processor located in the engine control device implements the transmitted information to control and modify an existing engine algorithm as shown in block 506, such as an idle shutdown device.

Figure 6A:
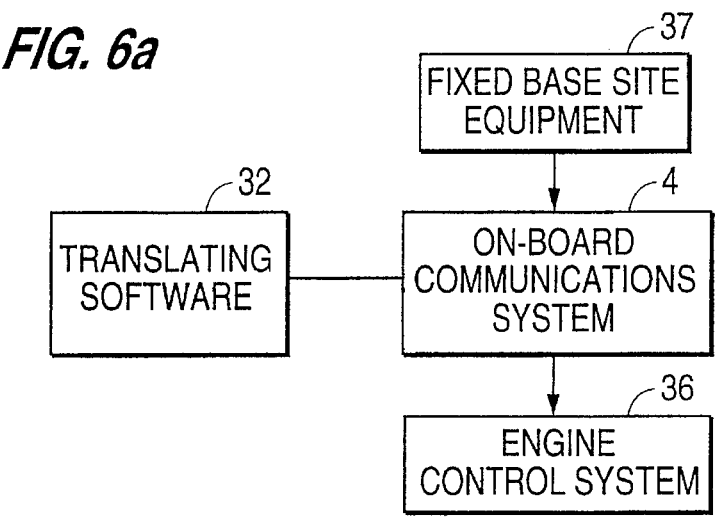
FIG. 6a is a block diagram of a second embodiment of the present invention.
Figure 6B:
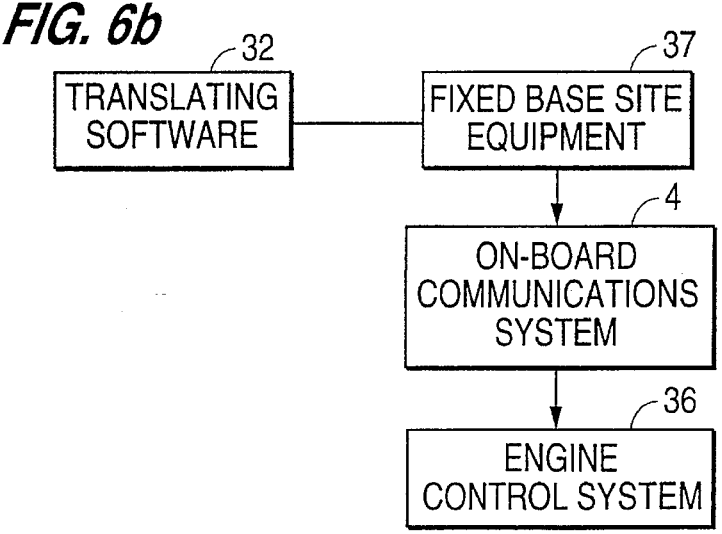
FIG. 6c is a block diagram of a fourth embodiment of the present invention.
Figure 6C:
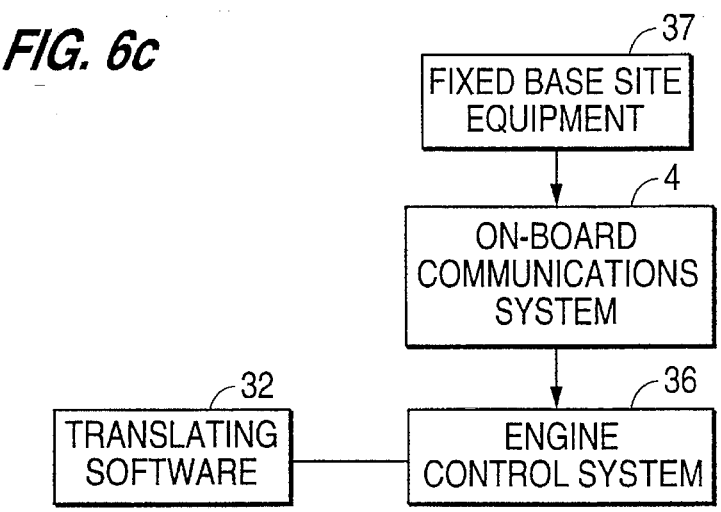

The translating software 32 may be housed in a number of different components of the vehicle control system 1, as shown in FIGS. 6a, 6b, and 6c, including the fixed base site equipment 37, the on-board communications system 4, and the engine control system 36. One alternative embodiment of the present invention, shown in FIG. 6a, includes the translating software 32 in the on-board communications system 4. The data could be converted into the SAE standard format before being routed to the engine control device via a data bus. In this embodiment, only one data bus would be used to connect the remote command interface device 8 and the engine control device 9.

Another alternative embodiment of the present invention is to house the translating software 32 in the fixed base site equipment 37, as shown in FIG. 6b. The data transmitted by the remote user could be converted in an SAE standard format before transmitting it to the vehicle for processing by the engine control device 9. Again, in this embodiment, only one data bus would be used to connect remote command interface device 8 and engine control device 9.

Yet another embodiment of the present invention houses the translating software in the engine control system 36, as shown in FIG. 6c. This embodiment would also only require one data bus between the remote command interface device 8 and the engine control device 9. The engine control device 9 would translate the remote command data as it is read from the data bus.

The serial data bus 29 routes the remote command data from the remote interface device 8 to the engine control device 9. The engine control device 9 comprises a microprocessor 33 which stores the time (e.g., 10 hours) entered by the fleet manager at the fixed base site 10. The microprocessor 33 has an internal timer which is programmed by the remote command data signal to run for a specific length of time. After the requested period of time has lapsed, the engine control device 9 then enables the idle shutdown device 2, which shuts the engine 3 down anytime an idle condition is detected for five minutes or more. Engine control device 9, shown as part of the engine control system 36 in FIG. 1a, may be constructed by modifying a conventional engine control device as found in the CELECT Engine Control System currently manufactured by the assignee, Cummins Engine Company.

While the invention has been described with reference to the aforementioned embodiments, it should be appreciated by those skilled in the art that the invention may be practiced otherwise than as specifically described herein without departing from the spirit and scope of the invention. It is therefore, understood that the scope of the invention is limited only by the appended claims.

INDUSTRIAL APPLICABILITY

The vehicle control system for selectively modifying and controlling engine algorithms from a remote location may be employed in any vehicle including, but not limited to, trucks, boats, automobiles, trains, airplanes and tractors. This system would be useful in any environment where a user desires to remotely change an existing engine algorithm based on information received from a vehicle operator.

What is claimed is:

1. A vehicle control system for controlling engine operation in response to execution of a sequence of commands stored onboard the vehicle and modifiable from a central fixed base site which monitors one or more such vehicles at a distant location, comprising:

(a) an engine control means connected to an engine of the vehicle including storage means for controlling the operation of said engine by executing a sequence of commands stored aboard the vehicle in said storage means;

(b) remote vehicle operation control means located at the fixed base site for generating and transmitting from said fixed base site to the vehicle an instruction to modify one or more of the stored sequence of commands;

(c) an on-board communications module for receiving said instruction from the fixed base site and modifying the sequence of commands stored in said storage means; and wherein engine operation occurring at any future time based on the execution of said stored sequence of commands may be remotely modified, in advance, by the generation and transmission of said instructions to modify said sequence of commands.

2. The vehicle control system of claim 1, further comprising idle shutdown means for automatically shutting the vehicle engine down after a predetermined time where no non-idle activity is sensed within said predetermined time wherein said engine control device controls the operation of said idle shutdown device, in response to a signal transmitted by a central fixed base site.

3. The vehicle control system of claim 2, wherein said idle control device shuts down said engine after a time entered by a remote user which is transmitted as data from said fixed base site through said vehicle on-board communication module to said engine control device where said data is processed and stored to modify the future operation of an engine after expiration of said time.

4. The vehicle control system of claim 2, wherein said idle shutdown device includes an electronic control module to monitor the activity of at least one of a throttle, clutch, and service brake.

5. The vehicle control system of claim 2, wherein said idle shutdown device includes a timer for shutting down a vehicle's engine after a predetermined period of time.

6. The vehicle control system of claim 1, further comprising a remote command interface device connected to said on-board communications module and said engine control device for providing a data link for command transmission between said on-board communications module and said engine control device.

7. The vehicle control system of claim 1, wherein said on-board communications module includes an alphanumeric keypad for entering messages to be transmitted to said fixed base site.

8. The vehicle control system of claim 1, wherein said on-board communications module transmits voice messages from a vehicle operator to said fixed base site.

9. The vehicle control system of claim 1, wherein said on-board communications module includes a display.

10. The vehicle control system of claim 1, wherein said on-board communications module includes a radio telephone.

11. The vehicle control system of claim 1, wherein said on-board communications module transmits data signals between a vehicle and said fixed base site.

12. The vehicle control system of claim 1, wherein said remote command interface device provides data communications between said on-board communications module and said engine control device.

13. The vehicle control system of claim 1, wherein said remote command interface device includes translating software.

14. The vehicle control system of claim 13, wherein said translating software translates said instruction to allow said engine control device to read said instruction from said data link.

15. A vehicle control system remotely operated to access an engine control device and selectively enable or disable an idle shutdown device which automatically shuts the engine of a vehicle down after detecting a predetermined period of continuous idling time, said system comprising:

a communicative means for transmitting information between a remote fixed base site and a vehicle via an on-board vehicle communications system; and a processing means located in said engine control device for analyzing and storing said information transmitted between said remote fixed base site and said vehicle, and for modifying and implementing a preexisting sequence of commands stored in said engine control device based on said information, wherein said engine control device uses said information transmitted between said remote fixed base site and said vehicle to disable said idle shutdown device and allow the engine of said vehicle to remain in an idle state for a determined period of time.

16. The vehicle control system of claim 15, wherein said communicative means includes at least one of a radio frequency and satellite link.

17. A vehicle control system for automatically stopping the engine of a vehicle after detecting a predetermined period of continuous idling time, said system comprising:

idle shutdown means or monitoring engine idling and automatically stopping the engine of a vehicle after detecting a predetermined period of continuous idling time; and idle shutdown bypass means connected to the idle shutdown means or receiving a remote user instruction to bypass said idle shutdown means and, in response to the instruction, allow the engine to idle for the duration of an idle bypass period set by the user through modification of an existing sequence of commands stored in said idle shutdown bypass means, and after the expiration of said idle bypass period, automatically reenable the operation of said idle shutdown means to limit idling time of the engine.

18. The vehicle control system of claim 17, wherein said predetermined period of said idling time is an idle shutdown time.

19. The vehicle control system of claim 17, wherein said idle bypass period is greater than said idle shutdown time.

20. The vehicle control system of claim 17, wherein said idle bypass period is a predetermined period of time.

21. The vehicle control system of claim 17, wherein said user instruction includes specification of said idle bypass period.

22. A method of varying the operation of an engine which is controlled by an electronic monitoring and control system using one or more programmed control algorithms, in response to commands received from a central remote fixed base site which monitors one or more vehicles at a distant location, comprising the steps of:

receiving data signals transmitted from said central remote fixed base site to a vehicle at a distant location;

interpreting said data signal to identify an instruction transmitted by a remote user;

identifying an engine algorithm to be modified based on said instruction; and varying said identified engine algorithm of said vehicle in accordance with said instruction transmitted by said remote user.

23. The method of varying the operation of an engine as defined in claim 22, wherein said data signal are transmitted over at least one of a radio frequency and satellite link.

24. The method of varying the operation of an engine as defined in claim 22, wherein said instruction includes a control signal to modify and control said engine algorithm.

25. The method of varying the operation of an engine as defined in claim 22, wherein said engine algorithm operates an automatic idle shutdown system.

\* \* \* \* \*